United States Patent [19]

Joseph et al.

[11] Patent Number: 5,176,952

[45] Date of Patent: Jan. 5, 1993

[54] MODULUS NONWOVEN WEBS BASED ON MULTI-LAYER BLOWN MICROFIBERS

[75] Inventors: Eugene G. Joseph, Arden Hills; Daniel E. Meyer, Stillwater, both of Minn.

[73] Assignee: Minnesota Mining and Manufacturing Company, St. Paul, Minn.

[21] Appl. No.: 768,161

[22] Filed: Sep. 30, 1991

[51] Int. Cl.$^5$ .............................................. B32B 27/00
[52] U.S. Cl. .................................... 428/284; 428/286; 428/287; 428/297; 428/298; 428/303
[58] Field of Search ............... 428/370, 373, 375, 378, 428/395, 396, 401, 903, 284, 297, 298, 286, 287, 303

[56] References Cited

U.S. PATENT DOCUMENTS

| | | | |
|---|---|---|---|
| 3,422,055 | 1/1969 | Maloney | 524/587 |
| 3,480,502 | 11/1969 | Schrenk | 156/271 |
| 3,487,505 | 1/1970 | Chisholm et al. | 18/13 |
| 3,557,265 | 1/1971 | Chisholm et al. | 264/47 |
| 3,672,802 | 6/1972 | Matsui et al. | 425/131 |
| 3,681,189 | 8/1972 | Matsui et al. | 161/175 |
| 3,687,589 | 8/1972 | Schrenk | 425/109 |
| 3,759,647 | 9/1973 | Schrenk et al. | 425/131 |
| 3,825,379 | 7/1974 | Lohkamp et al. | 425/72 |
| 3,841,953 | 10/1974 | Lohkamp et al. | 161/150 |
| 3,849,241 | 11/1974 | Butin et al. | 161/169 |
| 3,924,990 | 12/1975 | Schrenk | 425/131.1 |
| 3,971,373 | 7/1976 | Braun | 128/146.2 |
| 4,103,058 | 7/1978 | Humlicek | 428/171 |
| 4,117,194 | 9/1978 | Barbe et al. | 428/374 |
| 4,118,531 | 10/1978 | Hauser | 428/224 |
| 4,197,069 | 4/1980 | Cloeren | 425/131.1 |
| 4,295,809 | 10/1981 | Mikami et al. | 425/72 S |
| 4,323,534 | 4/1982 | Des Marais | 264/176 R |
| 4,375,718 | 3/1983 | Wadsworth et al. | 29/592 E |
| 4,381,274 | 4/1983 | Kessler et al. | 264/147 |
| 4,429,001 | 1/1984 | Kolpin et al. | 428/283 |
| 4,460,649 | 7/1984 | Park et al. | 428/373 |
| 4,557,972 | 12/1985 | Okamoto et al. | 428/373 |
| 4,627,950 | 12/1986 | Matsui et al. | 264/103 |
| 4,652,487 | 3/1987 | Morman | 428/138 |
| 4,657,802 | 4/1987 | Morman | 428/152 |
| 4,710,190 | 12/1987 | Wood et al. | 604/389 |
| 4,724,184 | 2/1988 | Killian et al. | 428/227 |
| 4,729,371 | 3/1988 | Krueger et al. | 128/206.19 |
| 4,755,178 | 7/1988 | Insley et al. | 604/367 |
| 4,777,080 | 10/1988 | Harris et al. | 428/903 |
| 4,818,463 | 4/1989 | Buehning | 264/40.1 |
| 4,818,597 | 4/1989 | Da Ponte et al. | 428/903 |
| 4,904,521 | 2/1990 | Johnson et al. | 428/903 |
| 4,939,008 | 7/1990 | Komaki | 428/34.3 |
| 4,986,743 | 1/1991 | Buehning | 425/7 |
| 5,039,431 | 8/1991 | Johnson et al. | 428/903 |

FOREIGN PATENT DOCUMENTS 0375200  6/1990  European Pat. Off. .
44-7745  4/1969  Japan .

OTHER PUBLICATIONS

Wente, Van A., "Superfine Thermoplastic Fibers", *Industrial Engineering Chemistry*, vol. 48, pp. 1342–1346.

Wente, Van A. et al., "Manufacture of Superfine Organic Fibers", Report No. 4364 of the Naval Research Laboratories, published May 25, 1954.

*Primary Examiner*—James J. Bell
*Attorney, Agent, or Firm*—Gary L. Griswold; Roger R. Tamte; William J. Bond

[57] ABSTRACT

A high modulus nonwoven web is produced using a high modulus material and a self-bonding material formed as multi-layer melt-blown microfibers where the web modulus is greater the $MX_1+MX_2$ where $M_1$ and $M_2$ represent the modulus values of webs formed from the two materials and $X_1$ and $X_2$ represent the respective volume portions of the materials in the web fibers.

16 Claims, 3 Drawing Sheets

MODULUS NONWOVEN WEBS BASED ON MULTI-LAYER BLOWN MICROFIBERS

FIELD OF THE INVENTION

The invention relates to novel high modulus melt-blown nonwoven webs useful in a variety of applications and the method for its production. The nonwoven webs include melt-blown microfibers comprised of longitudinally distinct polymeric layers of at least one relatively tacky material and at least one high modulus material.

BACKGROUND OF THE INVENTION

It has been proposed in U.S. Pat. No. 3,841,953 to form nonwoven webs of melt-blown fibers using polymer blends, in order to obtain webs having novel properties. A problem with these webs, however, is that the polymer interfaces causes weaknesses in the individual fibers that causes severe fiber breakage and weak points. The web tensile properties reported in this patent are inferior to those of webs made of corresponding single polymer fibers. This is likely done to weak points in the web from incompable polymer blends and the extremely short fibers in the web.

A method for producing bicomponent fibers in a melt-blown process is disclosed in U.S. Pat. No. 4,729,371. The polymeric materials are fed from two conduits which meet at a 180 degree angle. The polymer flowstreams then converge and exit via a third conduit at a 90 degree angle to the two feed conduits. The two feedstreams form a layered flowstream in this third conduit, which bilayered flowstream is fed to a row of side-by-side orifices in a melt-blowing die. The layered polymer melt streams extruded from the orifices are then formed into microfibers by a high air velocity attenuation or a "melt-blown" process. The product formed is used specifically to form a web useful for molding into a filter material. The process disclosed concerns forming two-layer microfibers. There is no disclosure of how to obtain webs with strengths significantly greater than webs formed of the individual materials used to form their moldable web.

U.S. Pat. No. 4,557,972 discloses a sheath-core composite fiber of an allegedly ultrafine denier (less than 0.5 denier). The fibers are formed from a special spinneret for forming large, three-component fibers, with two of the components forming ultrafine included material in a matrix of the third component. Ultrafine fibers are then obtained by selectively removing the matrix (the "sea") material, leaving the included material as fine fibers. This process is complex and cannot practically be used to form non-woven webs. Similar processes are proposed by U.S. Pat. Nos. 4,460,649, 4,627,950 and 4,381,274, which discuss various "islands-in-a-sea" processes for forming multi-component yarns. U.S. Pat. No. 4,117,194 describes a bicomponent textile spun fiber with improved crimp properties.

U.S. Pat. Nos. 3,672,802 and 3,681,189 describe spun fibers allegedly having a large number of layers of two polymer components. The two polymers are fed into a specially designed manifold that repeatedly combines, splits and re-combines a polymer stream(s) to form a somewhat stratified stream of the two distinct polymers. The process is similar to mixing the polymers due to the significant amount of non-linear polymer flow introduced during the repeated splitting and re-combining of the polymer stream(s). However, the splitting and re-combining is done in line with the polymer flow, and the resulting fibers apparently have distinct longitudinal regions of one or the other polymer rather than the substantially non-directional arrangement of the separate polymer regions one would obtain with incomplete batch mixing. However, the polymer layers in the fibers are very indistinct and irregular, and due to the excessively long contact period between the polymers, it would be difficult to handle polymers with significantly different melt viscosities by this process. The fibers produced are textile size, and the layering effect is done to improve certain properties over homogeneous fibers such as dyeability properties, electrification properties, hydrophilic properties or tensile properties. No mention is made of making multi-layer microfiber nonwoven webs having improved modulus.

SUMMARY OF THE INVENTION

The present invention is directed to a process for producing a non-woven web of longitudinally layered melt-blown microfibers. The microfibers are produced by a process comprising first feeding separate polymer melt streams to a manifold means, optionally separating at least one of the polymer melt streams into at least two distinct streams, and combining all the melt streams, including the separated streams, into a single polymer melt stream of longitudinally distinct layers, preferably of two different polymeric materials arrayed in an alternating manner. The combined melt stream is then extruded through fine orifices and formed into a web of melt-blown microfibers.

DESCRIPTION OF THE PREFERRED EMBODIMENTS

Figure 1:
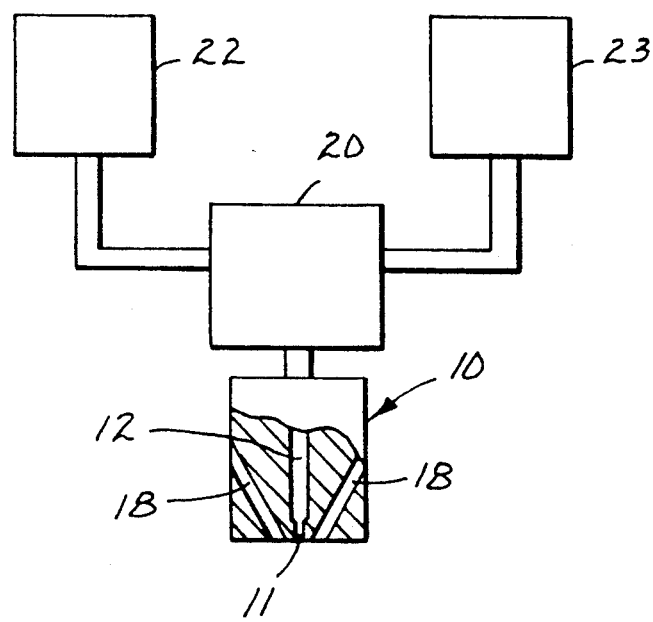
FIG. 1 is a schematic view of an apparatus useful in the practice of the invention method.

The microfibers produced are prepared, in part, using the apparatus discussed, for example, in Wente, Van A., "Superfine Thermoplastic Fibers," *Industrial Engineering Chemistry*, Vol. 48, pp 1342–1346 and in Wente, Van A. et al., "Manufacture of Superfine Organic Fibers," Report No. 4364 of the Naval Research Laboratories, published May 25, 1954, and U.S. Pat. Nos. 3,849,241 (Butin et al.), 3,825,379 (Lohkamp et al.), 4,818,463 (Buehning), 4,986,743 (Buehning), 4,295,809 (Mikami et al.) or 4,375,718 (Wadsworth et al.). These apparatuses and methods are useful in the invention process in the portion shown as die 10 in FIG. 1, which could be of any of these conventional designs.

The polymeric components are introduced into the die Cavity 12 of die 10 from a separate splitter, splitter region or combining manifold 20, and into the, e.g., splitter from extruders, such as 22 and 23. Gear pumps and/or purgeblocks can also be used to finely control the polymer flowrate. In the splitter or combining manifold, the polymeric component flowstreams are formed into a single layered flowstream. However, preferably, the polymers are kept out of direct contact for as long a period as possible prior to reaching the die 10. The polymeric flowstreams from the extruder(s) can also be split in the splitter (20). The split or separate flowstreams are combined only immediately prior to reaching the die, or die orifices. This minimizes the possibility of flow instabilities generating in the separate flowstreams, which tends to result in non-uniform and discontinuous longitudinal layers in the multi-layered microfibers. Flow instabilities can also have adverse effects on non-woven web properties such as modulus, temperature stability, or other desirable properties obtainable with the invention process.

The separate flowstreams are also preferably established into laminar flowstreams along closely parallel flowpaths. The flowstreams are then preferably combined so that at the point of combination, the individual flows are laminar, and the flowpaths are substantially parallel to each other and the flowpath of the resultant combined layered flowstream. This again minimizes turbulence and lateral flow instabilities of the separate flowstreams in the combining process.

It has been found that a suitable splitter 20, for the above-described step of combining separate flowstreams, is one such as is disclosed, for example, in U.S. Pat. No. 3,557,265, which describes a manifold that forms two or three polymeric components into a multi-layered rectilinear melt flow. The polymer flowstreams from separate extruders are fed into plenums then to one of the three available series of ports or orifices. Each series of ports is in fluid communication with one of the plenums. Each stream is thus split into a plurality of separated flowstreams by the series of ports, each with a height-to-width ratio of from about 0.01 to 1. The separated flowstreams from each of the three plenum chambers are then simultaneously coextruded into a single channel in an interlacing manner to provide a multi-layered flowstream. The combined, multi-layered flowstream in the channel is then transformed (e.g., in a coathangar transition piece), so that each layer extruded from the manifold orifices has a substantially smaller height-to-width ratio to provide a layered combined flowstream at the die orifices with an overall height of about 50 mils or less, preferably 15-30 mils or less. The width of the flowstream can be varied depending on the width of the die and number of die orifices arranged in a side-by-side array. Other suitable devices for providing a multi-layer flowstream are such as disclosed in U.S. Pat. Nos. 3,924,990 (Schrenk); 3,687,589 (Schrenk); 3,759,647 (Schrenk et al.) or 4,197,069 (Cloeren), all of which, except Cloeren, disclose manifolds for bringing together diverse polymeric flowstreams into a single, multi-layer flowstream that is ordinarily sent through a coathanger transition piece or neckdown zone prior to the film die outlet. The Cloeren arrangement has separate flow channels in the die cavity. Each flow channel is provided with a back-pressure cavity and a flow-restriction cavity, in successive order, each preferably defined by an adjustable vane. The adjustable vane arrangement permits minute adjustments of the relative layer thicknesses in the combined multi-layered flowstream. The multi-layer polymer flowstream from this arrangement need not be transformed to the appropriate height/width ratio, as this is done by the vanes, and the combined flowstream can be fed directly into the die cavity 12.

From the die cavity 12, the multi-layer polymer flowstream is extruded through an array of side-by-side orifices 11. As discussed above, prior to this extrusion, the feed can be formed into the appropriate profile in the cavity 12, suitably by use of a conventional coathanger transition piece. Air slots 18, or the like, are disposed on either side of the row of orifices 11 for directing uniform heated air at high velocity at the extruded layered melt streams. The air temperature is generally about that of the melt stream, although preferably 20°-30° C. higher than the melt temperature. This hot, high-velocity air draws out and attenuates the extruded polymeric material, which will generally solidify after traveling a relatively short distance from the die 10. The solidified or partially solidified fibers are then formed into a web by known methods and collected (not shown). The collecting surface can be a solid or perforated surface in the form of a flat surface or a drum, a moving belt, or the like. If a perforated surface is used, the backside of the collecting surface can be exposed to a vacuum or low-pressure region to assist in the deposition of fibers, such as is disclosed in U.S. Pat. No. 4,103,058 (Humlicek). This low-pressure region allows one to form webs with pillowed low-density regions. The collector distance can generally be from 3 to 50 inches from the die face. With closer placement of the collector, the fibers are collected when they have more velocity and are more likely to have residual tackiness from incomplete cooling. This is particularly true for inherently more tacky thermoplastic materials, such as thermoplastic elastomeric materials. Moving the collector closer to the die face, e.g., 3 to 12 inches, preferably, will result in stronger inter-fiber bonding and a less lofty web. Moving the collector back will generally tend to yield a loftier and less coherent web.

The temperature of the polymers in the splitter region is generally about the temperature of the higher melting point component as it exits its extruder. This splitter region or manifold is typically integral with the die and is kept at the same temperature. The temperature of the separate polymer flowstreams can also be controlled to bring the polymers closer to a more suitable relative viscosity. When the separate polymer flowstreams converge, they should generally have an apparent viscosity of from 150 to 800 poise (as measured by a capillary rheometer). The relative viscosities of the separate polymeric flowstreams to be converged should generally be fairly well matched. Empirically, this can be determined by varying the temperature of the melt and observing the crossweb properties of the collected web. The more uniform the crossweb properties, the better the viscosity match. The overall viscosity of the layered combined polymeric flowstream(s) at the die face should be from 150 to 800 poise, preferably from 200 to 400 poise. The differences in relative viscosities are preferably generally the same as when the separate polymeric flowstreams are first combined. The apparent viscosities of the polymeric flowstream(s) can be adjusted at this point by varying the temperatures as per U.S. Pat. No. 3,849,241 (Butin et al).

The size of the polymeric fibers formed depends to a large extent on the velocity and temperature of the attenuating airstream, the orifice diameter, the temperature of the melt stream, and the overall flow rate per orifice. At high air volume rates, the fibers formed have an average fiber diameter of less than about 10 micrometers, however, there is an increased difficulty in obtaining webs having uniform properties as the air flow rate increases. At more moderate air flow rates, the polymers have larger average diameters, however, with an increasing tendency for the fibers to entwine into formations called "ropes". This is dependent on the polymer flow rates, of course, with polymer flow rates in the range of 0.05 to 0.5 gm/min/orifice generally being suitable. Coarser fibers, e.g., up to 25 micrometers or more, can be used in certain circumstances such as large pore, or coarse, filter webs.

The multi-layer microfibers of the invention can be admixed with other fibers or particulates prior to being collected. For example, sorbent particulate matter or fibers can be incorporated into the coherent web of blown multi-layered fibers as discussed in U.S. Pat. Nos. 3,971,373 or 4,429,001. In these patents, two separate streams of melt-blown fibers are established with the streams intersecting prior to collection of the fibers. The particulates, or fibers, are entrained into an airstream, and this particulate-laden airstream is then directed at the intersection point of the two microfiber streams. Other methods of incorporating particulates or fibers, such as staple fibers, bulking fibers or binding fibers, can be used with the invention method of forming melt-blown microfiber webs, such as is disclosed, for example, in U.S. Pat. Nos. 4,118,531, 4,429,001 or 4,755,178, where particles or fibers are delivered into a single stream of melt-blown fibers.

Other materials such as surfactants or binders can be incorporated into the web before, during or after its collection, such as by use of a spray jet. If applied before collection, the material is sprayed on the stream of microfibers, with or without added fibers or particles, traveling to the collection surface.

The microfibers for the invention high modulus nonwoven web are formed from a relatively high modulus material in conjunction with a relatively high tack (or self-bonding) material. This relatively high modulus material is a nonelastomeric amorphous or semi-crystalline thermoplastic material. The web is collected at a distance relative to the die such that the relatively high tack material exhibits residual tack or adhesive properties on the collecting surface to aid interfiber bonding, or self-bonding. However, the relatively high modulus material can be collected after it has lost substantially all tack. Generally, the high modulus material will have a melting point about 30° C. higher or more than that of the high tack layer material, preferably this difference is at least 50° C.

This combination of materials in a multi-layer meltblown fiber provides high modulus nonwoven webs. Specifically the tensile modulus of the resulting multilayer melt-blown webs are generally higher than corresponding untreated or unconsolidated webs made solely of the materials of either layer under similar process conditions. For some layer arrangements collected under certain process conditions, the resulting multilayer fiber web may have a modulus lower than that of a corresponding single layer web of the higher modulus material. However, the multi-layer fiber web of the invention will still have a modulus above a mean web modulus. The mean web modulus is defined as $M_1X_1 + M_2X_2$ where M is the web modulus of the corresponding single layer web and $X_i$ is the fraction of the fiber volume of layer i. Preferably, the multi-layer fiber web modulus will be at least 1.5 times that of the mean web modulus, most preferably 2.5 times.

The self-bonding component is generally a material which will permit rapid autogenous fiber bonding over a broad range of collector to die distances used in typical melt-blown processing. Such materials include the class of thermoplastic fiber forming elastomeric material such as those discussed in U.S. Pat. Nos. 4,652,487 (Morman), 4,323,534 (Des Marais) or 4,724,184 (Killian et al.). The use of non-elastic materials that have a suitable tack open time in a melt-blown process can also be employed, such as polymers or copolymers of butylenes or caprolactones, or blends of elastic or non-elastic polymers, such as with appropriate tackifiers.

Generally, the self-bonding component will have a glass transition temperature below room temperature (about 25° C.), preferably below about 15° C. For semi-crystalline materials, the crystallization half life at a temperature 15° C. below the melting temperature of the polymer will be greater than 50,000 seconds and preferably greater than 100,000 seconds. For block copolymers or sequential copolymers, the soft segments or the elastomeric segments or blocks will comprise at least about 50 percent of the polymer and preferably at least 30 percent of the polymer. The soft or elastomeric segments or blocks should have a glass transition temperature below room temperature and preferably below about 15° C. The crystallization half life should be as described above for semi-crystalline materials. Elastomeric materials can be most of such materials suitable for processing by melt-blowing techniques. This would include polymers such as polyurethanes (e.g., "Morthane ™", available from Morton Thiokol Corp.); A-B block copolymers where A is formed of poly(vinyl arene) moieties such as polystyrene, and B is an elastomeric mid-block such as a conjugated diene or a lower alkene in the form of a linear di- or tri-block copolymer or a star, radial or branched copolymer, such as elastomers sold as "KRATON ™" (Shell Chemical Co.); polyetheresters (such as "Arnitel ™" available from Akzo Plastics Co.); or polyamides (such as "Pebax ™" available from Autochem Co.). Copolymers and blends can also be used. For example, A-B block copolymer blends as described in U.S. Pat. No. 4,657,802 are suitable where such block copolymers are preferably blended with polyalkylenes. Other possible materials include ethylene copolymers such as ethylene vinyl acetates, ethylene/propylene copolymer elastomers or ethylene/propylene/diene terpolymer elastomers.

For extremely low modulus elastomers, it may be desirable to provide greater rigidity and strength. For example, up to 50 weight percent, but preferably less than 30 weight percent, of polymers can be added as stiffening aids such as polyvinylstyrenes, polystyrenes such as poly(alpha-methyl)styrene, polyesters, epoxies, polyolefins, e.g., polyethylene or certain ethylene/vinyl acetates, preferably those of higher molecular weight, or coumarone-indene resin.

Viscosity reducing materials and plasticizers can also be blended with the elastomers such as low molecular weight polyethylene and polypropylene polymers and copolymers, or tackifying resins such as Wingtack ™, aliphatic hydrocarbon tackifiers available from Goodyear Chemical Company.

Other suitable materials include the low temperature tacky polymeric blends disclosed in Wood et al., U.S. Pat. No. 4,710,190, which teaches a blend of high molecular weight portions, preferably at least 20,000, with low molecular weight portions. The high and low molecular weight portions can include ethylene-or propylene-based copolymers with polar monomers such as ethylene/vinylacetate, or polybutylene or like materials that exhibit high self-bonding characteristics when melt-blown. Other suitable materials include the above-discussed block copolymer elastomers with end-block resins such as coumarone-indene or alpha-methyl styrene. Other suitable low molecular weight materials could include low molecular weight polyesters, polyester-polyamides, polyolefins or the like.

The relatively high modulus material is preferably one that is capable of forming relatively high modulus melt-blown fibers. Generally useful are melt blowable orientatable polymers. Useful materials include non-elastic polyesters, such as polyethylene terephthalate: polyalkylenes, such as poly 4-methyl-1-pentene or polypropylene; polyamides, such as nylon 6; polystyrenes; polyarylsulfones; or blends or copolymers.

Fiber and web modulus can be controlled within wide ranges for given combinations of polymer layers by varying, independently, the relative ratios of the polymer layers. the layer order in the microfibers, the number of layers, the collector distance and other process variables. The invention thus allows precise control of web modulus by varying one or all of these variables.

The collector distance. melt temperature, primary air temperature. and the presence or absence of any secondary cooling airstreams, determine the relative degree of tack present in the tacky or self-bonding layer material. With closer placements of the collector the tacky self-bonding layer material will more readily provide interfiber bonding in the collected web. At certain close collector locations. e.g. about 20 cm and less, the non-elastic relatively high modulus layer material will also contribute to interfiber bonding. However, at very close collector distances if both components are contributing significantly to interfiber bonding the web will tend to become filmlike and boardy. This is undesirable for most applications and as such preferably the web is collected at a distance where excessive interfiber bonding is not prevalent. This collection distance will vary depending on the layer compositions, and thicknesses, but generally it is preferred to have the collector at least about 15 cm from the die. Generally, it is preferred to collect the fibers at a distance which the tacky self-bonding material will still exhibit some tack and interfiber bonding. The further the collector distance, however, the loftier the web. To obtain a coherent web, it is preferred to have the collector at a distance of less than about 70 cm. However, the webs can be collected at distances greater than this and subjected to a post-consolidation treatment, that could also be a pressure treatment, as by use of calendering rolls. By using these treatments, web modulus could be enhanced at selected regions or in patterns with superior loft and softness in the unconsolidated regions.

The self-bonding material layers can advantageously comprise 1 to 99 volume percent of the total fiber volume. At the low end of this volume range, the self-bonding layers can still contribute significantly to the surface properties of the fibers forming the web without significantly modifying the bulk fiber properties, such as tensile modulus behavior, particularly if the self-bonding layers are outside layers. In this manner, the polymers or materials with desirable bulk properties, such as tensile modulus, can be combined with self-bonding polymers or materials having desirable surface properties in individual microfibers of a melt-blown web to provide melt-blown webs exhibiting a relative high proportion of the desirable properties from each type of polymer or material. Generally, the higher modulus material will preferably comprise at least 10 percent of the fiber volume for preferred enhancement of the web modulus.

With the invention high modulus web the web modulus properties can be altered by variations in the number of layers employed at a given relative volume percent and layer arrangement. Variation in the number of layers, at least at a low number of layers, has a tendency to significantly vary the relative proportion of each polymer (assuming two polymeric materials) at the microfiber surface. This (assuming alternating layers of two polymeric materials) translates into variation of those web properties to which the microfiber surface properties significantly contribute, such as bondability. Thus, web properties can change depending on what polymer or material composition comprises which layer(s). However, as the number of layers increases, this variation in web properties based on the surface area effects diminishes. At higher-layer numbers, the relative thicknesses of the individual fiber layers will decrease, significantly decreasing the surface area effect of any individual layer. For the preferred melt-blown microfibers with average diameters of less than 10 micrometers, the individual layer thicknesses can get well below 1 micrometer.

Additional effects on the fiber and web modulus properties can be attributed to the increase in the number of layers alone. Specifically, it has been found that fiber and web modulus increases significantly with increases in the number of individual layers. Although not wishing to be bound by theory, it is believed that this decrease in individual layer thicknesses in the microfiber has a significant effect on the crystalline structure and behavior of the component polymers. For example, spherulitic growth could be constrained by adjacent layers resulting in more fine-grained structures. Further, the interfacial layer boundaries may constrain transverse polymer flow in the orifice increasing the relative percent of axial flow, tending to increase the degree of order of the polymers in layered form. These factors can likely influence the macro scale modulus behavior of the component fibers in the web and hence web behavior itself. This has been seen in practice, as web modulus tends to increase with increased layering, indicating increased fiber tensile modulus and implicitly increased molecular and crystalline orientation.

Further, with increased microfiber layering, the number of interfaces, and interfacial areas, between adjacent layers, increases significantly. This could tend to increase modulus due to increased reinforcement and constrainment of the individual layers. It has been found that it becomes increasingly difficult to separate the fiber inner layers as the total number of layers in the fibers increases. This is true even for relatively incompatible polymers that would ordinarily require compatibilizers or bonding layers to prevent layer separation.

The number of layers obtainable with the invention process is theoretically unlimited. Practically, the manufacture of a manifold, or the like, capable of splitting and/or combining multiple polymer streams into a very highly layered arrangement would be prohibitively complicated and expensive. Additionally, in order to obtain a flowstream of suitable dimensions for feeding to the die orifices, forming and then maintaining layering through a suitable transition piece can become difficult. A practical limit of 1,000 layers is contemplated, at which point the processing problems would likely outweigh any potential added property benefits.

The webs formed can be of any suitable thickness for the desired intended end use. However, generally a thickness from 0.01 to 5 centimeters is suitable for most applications. Further, for some applications, the web can be a layer in a composite multi-layer structure. The other layers can be supporting webs, films (such as elastic films, semi-permeable films or impermeable films). Other layers could be used for purposes such as absorbency, surface texture, rigidification and can be non-woven webs formed of, for example, staple, spunbond, and/or melt-blown fibers. The other layers can be attached to the invention melt-blown web by conventional techniques such as heat bonding, adhesives or mechanical engagement, such as hydroentanglement or needle punching. Other structures could also be included in a composite structure, such as reinforcing or elastic threads or strands, which would preferably be sandwiched between two layers of the composite structures. These strands or threads can likewise be attached by the conventional methods described above.

Webs or composite structures including webs of the invention can be further processed after collection or assembly such as by calendering or point embossing to increase web modulus, provide a patterned surface, and fuse fibers at contact points in a web structure or the like; orientation to provide increased web modulus; needle punching; heat or molding operations; coating, such as with adhesives to provide a tape structure; or the like.

The following examples are provided to illustrate presently contemplated preferred embodiments and the best mode for practicing the invention, but are not intended to be limiting thereof.

TEST PROCEDURES

Tensile Modulus

Tensile modulus (Young's modulus) data on the multi-layer BMF webs was obtained using an Instron Tensile Tester (Model 1122) with a 10.48 cm (2 in.) jaw gap and a crosshead speed of 25.4 cm/min. (10 in./min.). Web samples were 2.54 cm (1 in.) in width. Elastic recovery behavior of the webs was determined by stretching the sample to a predetermined elongation and measuring the length of the sample after release of the elongation force and allowing the sample to relax for a period of 1 minute.

Wide Angle X-Ray Scattering Test

X-Ray diffraction data were collected using a Philips APD-3600 diffractometer (fitted with a Paur HTK temperature controller and hot stage). Copper K$\alpha$ radiation was employed with power tube settings of 45 kV and 4 mA and with intensity measurements made by means of a Scintillation detector. Scans within the 2-50 degree (2$\Theta$) scattering region were performed for each sample at 25 degrees C. and a 0.02 degree step increment and 2 second counting time.

Thermal Properties

Melting and crystallization behavior of the polymeric components in the multi-layered BMF webs were studied using a Perkin-Elmer Model DSC-7 Differential Scanning Calorimeter equipped with a System 4 analyzer. Heating scans were carried out at 10° or 20° C. per minute with a holding time of three (3) minutes above the melting temperature followed by cooling at a rate of 10° C. per minute. Areas under the melting endotherm and the crystallization exotherm provided an indication of the amount of crystallinity in the polymeric components of the multi-layered BMF webs.

EXAMPLE 1

A polypropylene/polyurethane multi-layer BMF web of the present invention was prepared using a melt-blowing process similar to that described, for example, in Wente, Van A., "Superfine Thermoplastic Fibers," in *Industrial Engineering Chemistry*,. Vol. 48, pages 1342 et seq (1956), or in Report No. 4364 of the Naval Research Laboratories, published May 25, 1954, entitled "Manufacture of Superfine Organic Fibers" by Wente, Van A.; Boone, C. D.; and Fluharty, E. L., except that the BMF apparatus utilized two extruders, each of which was equipped with a gear pump to control the polymer melt flow, each pump feeding a five-layer feedblock (splitter) assembly similar to that described in U.S. Pat. Nos. 3,480,502 (Chisholm et al.) and 3,487,505 (Schrenk) which was connected to a melt-blowing die having circular smooth surfaced orifices (10/cm) with a 5:1 length to diameter ratio. The first extruder (260° C.) delivered a melt stream of a 800 melt flow rate (MFR) polypropylene (PP) resin (PP 3495G, assembly which was heated to about 260° C. The second extruder, which was maintained at about 220° C., delivered a melt stream of a poly(esterurethane) (PU) resin ("Morthane TM " PS 455-200, available from Morton Thiokol Corp.) to the feedblock. The feedblock split the two melt streams. The polymer melt streams were merged in an alternating fashion into a five-layer melt stream on exiting the feedblock, with the outer layers being the PP. resin. The gear pumps were adjusted so that a 75:25 pump ratio PP:PU polymer melt was delivered to the feedblock assembly and a 0.14 kg/hr/cm die width (0.8 lb/hr/in.) polymer throughput rate was maintained at the BMF die (260° C.). The primary air temperature was maintained at approximately 220° C. and at a pressure suitable to produce a uniform web with a 0.076 cm gap width. Webs were collected at a collector to BMF die distance of 30.5 cm (12 in.). The resulting BMF web, comprising five-layer microfibers having an average diameter of less than about 10 micrometers, had a basis weight of 50 g/m$^2$.

EXAMPLE 2

A BMF web having a basis weight of 50 g/m$^2$ and comprising five-layer microfibers having an average diameter of less than about 10 micrometers was prepared according to the procedure of Example 1, except that the PP and PU melt streams were delivered to the five-layer feedblock in a 50:50 ratio.

EXAMPLE 3

A BMF web having a basis weight of 50 g/m$^2$ and comprising five-layer microfibers having an average diameter of less than about 10 micrometers was prepared according to the procedure of Example 1, except that the PP and PU melt streams were delivered to the five-layer feedblock in a 25:75 ratio.

CONTROL WEB I

A control web of the 800 MFR polypropylene resin was prepared according to the procedure of Example 1, except that only one extruder, which was maintained at 260° C., was used, and it was connected directly to the BMF die through a gear pump. The die and air temperatures were maintained at 260° C. The resulting BMF web had a basis weight of 50 g/m² and an average fiber diameter of less than about 10 micrometers.

CONTROL WEB II

A control web of the polyurethane resin ("Morthane ™ " PS455-200) was prepared according to the procedure of Example 1, except that only one extruder, which was maintained at 220° C., was used which was connected directly to the BMF die through a gear pump. The die and air temperatures were maintained at 220° C. The resulting BMF web had a basis weight of 50 g/m² and an average fiber diameter of less than about 10 micrometers.

Table 1 summarizes the tensile modulus values for BMF webs comprising five-layer microfibers of varying PP/PU polymer ratios.

TABLE 1

| | Tensile Modulus Five-Layer PP/PU BMF Webs 50 g/m² Basis Weight | | |
|---|---|---|---|
| | Pump Ratio | Tensile Modulus | |
| Example | PP/PU | MD (kPa) | XMD (kPa) |
| Control I | 100:0 | 2041 | 2897 |
| 1 | 75:25 | 6821 | 9235 |
| 2 | 50:50 | 8083 | 9490 |
| 3 | 25:75 | 8552 | 12214 |
| Control II | 0:100 | 1055 | 1814 |

EXAMPLE 4

A BMF web having a basis weight of 100 g/m² and comprising two-layer microfibers having an average diameter of less than about 10 micrometers was prepared according to the procedure of Example 3, except that the PP and PU melt streams were delivered to a two-layer feedblock, and the die and air temperatures were maintained at about 230° C.

EXAMPLE 5

A BMF web having a basis weight of 100 g/m² and comprising three-layer microfibers having an average diameter of less than about 10 micrometers was prepared according to the procedure of Example 3, except that the PP and PU melt streams were delivered to a three-layer feedblock.

EXAMPLE 6

A BMF web having a basis weight of 100 g/m² and comprising five-layer microfibers having an average diameter of less than about 10 micrometers was prepared according to the procedure of Example 3. Example 3 is a five-layer construction.

EXAMPLE 7

A BMF web having a basis weight of 100 g/m² and comprising twenty-seven-layer microfibers having an average diameter of less than 10 micrometers was prepared according to the procedure of Example 3, except that the PP and PU melt streams were delivered to a twenty-seven-layer feedblock.

Table 2 summarizes the modulus values for a series of BMF webs having a 25:75 PP/PU pump ratio, but varying numbers of layers in the microfibers.

TABLE 2

| Web Modulus as a Function of Layers in Microfiber 25:75 PP/PU Pump Ratio 100 g/m² Basis Weight | | |
|---|---|---|
| Example | Number of Layers | MD Tensile Modulus (kPa) |
| 4 | 2 | 10835 |
| 5 | 3 | 11048 |
| 6 | 5 | 15014 |
| 7 | 27 | 17097 |

Figure 2:
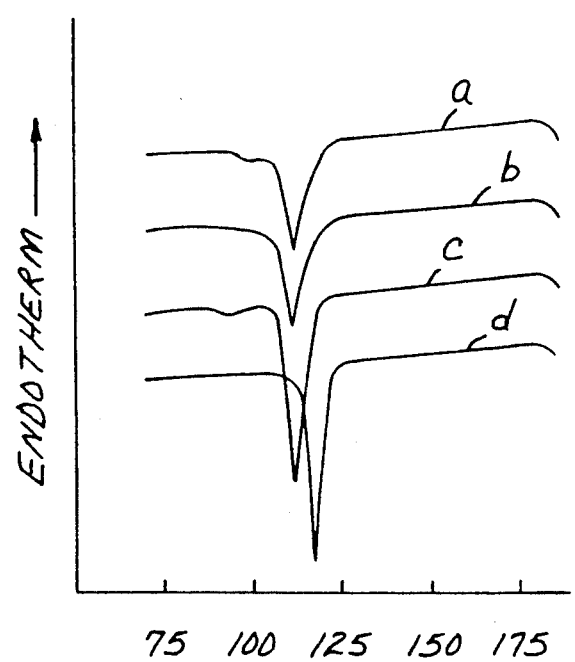
FIG. 2 is a plot of differential scanning calorimetry scans for Examples 4–7 showing increasing exotherms with increasing layering.
Figure 3:
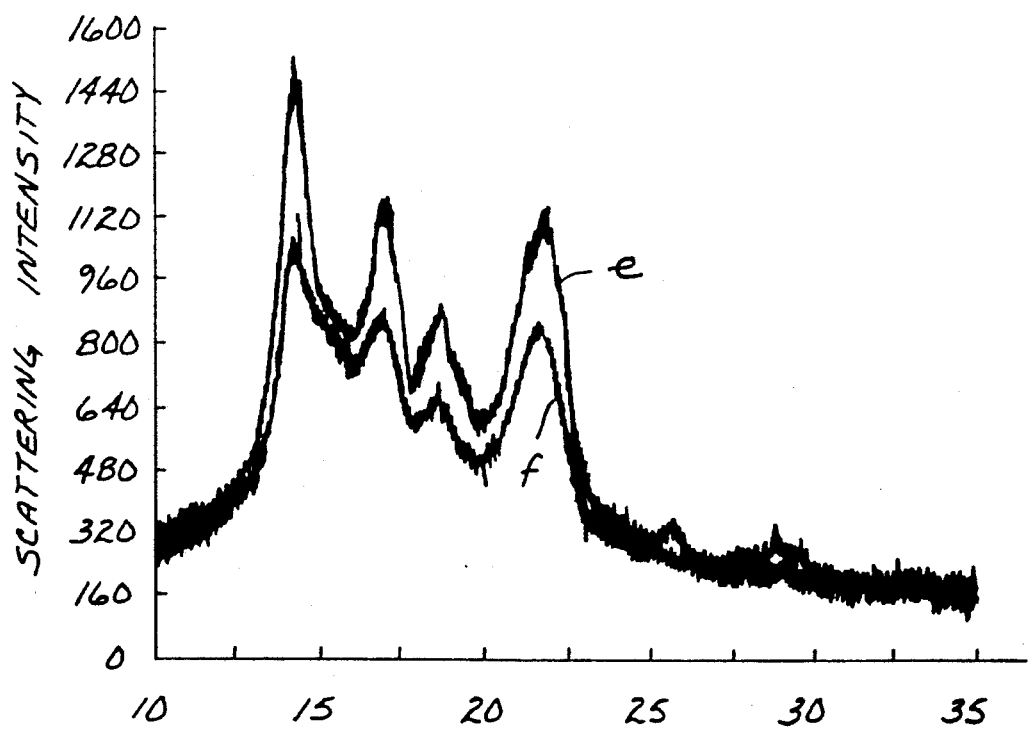
FIG. 3 is a plot of wide-angle x-ray scattering for Examples 5 and 7 showing increasing crystallinity with increasing layering.

The effect that the number of layers within the microfiber cross-section had on the crystallization behavior of the PP/PU BMF webs was studied using differential scanning calorimetry the results of which are graphically presented in FIG. 2. An examination of the crystallization exotherms for the BMF webs of Examples 4, 5, 6 and 7 (a, b, c and d, respectively), which corresponds to blown microfibers having 2, 3, 5 and 27 layers, respectively, indicates that the peak of the crystallization exotherm for the web of Example 7 is approximately 6° C. higher than the corresponding peak values for webs comprising blown microfibers having fewer layers. This data suggests that the crystallization process is enhanced in the microfibers having 27 layers, which is further supported by the examination of the wide angle X-ray scattering data that is illustrated in FIG. 3 and confirms higher crystallinity in the PP of the 27 layer microfiber web samples (e corresponds to Example 7 and f corresponds to Example 5 after washing out the PU with tetrahydrofuran).

EXAMPLE 8

A BMF web having a basis weight of 100 g/m² and comprising two-layer microfibers having an average diameter of less than 10 micrometers was prepared according to the procedure of Example 1, except that a 105 MI low-density polyethylene (LLDPE, Aspun ™ 6806 available from Dow Chemical) was substituted for the polypropylene and a poly(esterurethane) (PU) resin ("Morthane ™ " PS 440-200, available from Morton Thiokol Corp.) was substituted for the Morthaner ™ PS 455-200, the extruder temperatures were maintained at 230° C. and 230° C., respectively. the melt streams were delivered to a two-layer feedblock maintained at 230° C. at a 75:25 ratio, the BMF die and primary air supply temperatures were maintained at 225° C. and 215° C., respectively, and the collector distance was 30.5 cm.

EXAMPLE 9

A BMF web having a basis weight of 100 g/m² and comprising two-layer microfibers having an average diameter of less than 10 micrometers was prepared according to the procedure of Example 8, except that the PE and PU melt streams were delivered to the two-layer feedblock in a 50:50 ratio.

EXAMPLE 10

A BMF web having a basis weight of 100 g/m² and comprising two-layer microfibers having an average diameter of less than 10 micrometers was prepared according to the procedure of Example 8, except that the PE and PU melt streams were delivered to the two-layer feedblock in a 25:75 ratio.

CONTROL WEB IIX

A control web of the LLDPE resin (Aspun™ 6806) was prepared according to the procedure of Example 1, except that only one extruder, which was maintained at 210° C., was used, and it was connected directly to the BMF die through a gear pump, and the die and air temperatures were maintained at 210° C., and the collector distance was 25.4 cm. The resulting BMF web had a basis weight of 100 g/m² and an average fiber diameter of less than about 10 micrometers.

CONTROL WEB IV

A control web of the polyurethane resin (Morthane™ PS440-200) was prepared according to the procedure of Example 1, except that only one extruder, which was maintained at 230° C., was used which was connected directly to the BMF die through a gear pump, and the die and air temperatures were maintained at 230° C. The resulting BMF web had a basis weight of 100 g/m² and an average fiber diameter of less than about 10 micrometers.

Table 3 summarizes the tensile modulus and peak strength values for BMF webs comprising two-layer microfibers of varying PE/PU compositions.

TABLE 3

Tensile Modulus
Two-Layer PE/PU BMF Webs 100 g/m² Basis Weight

| Example | Pump Ratio PE/PU | MD Tensile Modulus (kPa) | Peak Load Strength (g) |
|---|---|---|---|
| Control III | 100:0 | 1172 | 63.6 |
| 8 | 75:25 | 4923 | 818 |
| 9 | 50:50 | 3737 | 941 |
| 10 | 25:75 | 2654 | 1827 |
| Control IV | 0:100 | 2130 | 2313 |

EXAMPLE 11

A BMF web having a basis weight of 50 g/m² and comprising five-layer microfibers having an average diameter of less than about 10 micrometers was prepared according to the procedure of Example 1, except that a poly(ethylene terephthalate) resin (PET having an I.V.=0.60, and a melting point of about 257° C., prepared as described in U.S. Pat. No. 4,939,008, col. 2, line 6 to col. 3, line 20) was substituted for the polypropylene and a poly(esterurethane) (PU) resin (Morthane™ PS 440-200, available from Morton Thiokol Corp.) was substituted for the Morthane™ PS 455-200 (in a 75:25 ratio), the melt streams were delivered to the five-layer feedblock at about 280° C. and about 230° C., respectively, and the feedblock, die and air temperatures were maintained at 280° C., 280° C. and 270° C., respectively.

EXAMPLE 12

A BMF web having a basis weight of 50 g/m² and comprising five-layer microfibers having an average diameter of less than about 10 micrometers was prepared according to the procedure of Example 11, except that the PET and PU melt streams were delivered to the five-layer feedblock in a 50:50 ratio.

EXAMPLE 13

A BMF web having a basis weight of 50 g/m² and comprising five-layer microfibers having an average diameter of less than 10 micrometers was prepared according to the procedure of Example 11, except that the PET and PU melt streams were delivered to the five-layer feedblock in a 25:75 ratios.

CONTROL WEB V

A control web of the poly(ethylene terephthalate) (I.V.=0.60) resin was prepared according to the procedure of Example 1, except that only one extruder, which was maintained at about 300° C., was used which was connected directly to the BMF die through a gear pump, and the die and air temperatures were maintained at 300° C. and 305° C., respectively. The resulting BMF web had a basis weight of 100 g/m² and an average fiber diameter of less than about 10 micrometers.

Table 4 summarizes the tensile modulus and peak strength values for BMF webs comprising five-layer microfibers of varying PET/PU ratios.

TABLE 4

Tensile Modulus
Five-Layer PET/PU BMF Webs 50 g/m² Basis Weight

| Example | Pump Ratio PET/PU | MD Tensile Modulus (kPa) | Peak Load Strength(g) |
|---|---|---|---|
| Control V | 100:0 | 772[1] | 136 |
| 11 | 75:25 | 9674 | 1132 |
| 12 | 50:50 | 10770 | 1264 |
| 13 | 25:75 | 12376 | 1050 |
| Control IV | 0:100 | 1834[1] | 2313 |

[1]100 g/m² basis weight.

EXAMPLE 14

A BMF web having a basis weight of 50 g/m² and comprising five-layer microfibers having an average diameter of less than about 10 micrometers was prepared according to the procedure of Example 1, except that a 60/40 blend of Kraton™ G-1657, a hydrogenated styrene/ethylene-butylene/styrene A-B-A block copolymer (SEBS) available from Shell Chemical Corp., and a linear low-density polyethylene (LLDPE) Aspun™ 6806, 105 MFR, available from Dow Chemical, was substituted for the Morthane™ PS 455-200, the extruder temperatures were maintained at 250° C. and 270° C., respectively, the melt streams were delivered to a five-layer feedblock maintained at 270° C. at a 75:25 ratio, and the die and primary air temperatures were maintained at 270° C. and 255° C., respectively.

EXAMPLE 15

A BMF web having a basis weight of 50 g/m² and comprising five-layer microfibers having an average diameter of less than about 10 micrometers was prepared according to the procedure of Example 14, except that the PP and SEBS/LLDPE blend melt streams were delivered to the five-layer feedblock in a 50:50 ratio.

EXAMPLE 16

A BMF web having a basis weight of 50 g/m² and comprising five-layer microfibers having an average diameter of less than about 10 micrometers was prepared according to the procedure of Example 14, except that the PP and SEBS/LLDPE blend melt streams were delivered to the five-layer feedblock in a 25:75 ratio.

CONTROL WEB VI

A control web of the 60/40 SEBS/LLDPE blend was prepared according to the procedure of Example 1, except that only one extruder, which was maintained at 270° C., was used which was connected directly to the BMF die through a gear pump, and the die and air temperatures were maintained at 270° C. The resulting BMF web had a basis weight of 50 g/m² and an average fiber diameter of less than 10 micrometers.

Table 5 summarizes the tensile modulus and peak strength values for BMF webs comprising five-layer microfibers of varying PP//SEBS/LLDPE compositions.

TABLE 5

Tensile Modulus
Five-Layer PP//SEBS/LLDPE BMF Webs 50 g/m² Basis Weight

| Example | Pump Ratio PP/Blend | MD Tensile Modulus (kPa) | Peak Load Strength(g) |
|---|---|---|---|
| Control I | 100:0 | 2034 | — |
| 14 | 75:25 | 18685 | 818 |
| 15 | 50:50 | 12011 | 714 |
| 16 | 25:75 | 6978 | 604 |
| Control VI | 0:100 | 434 | 145 |

EXAMPLE 17

A BMF web having a basis weight of 50 g/m² and comprising two-layer microfibers having an average diameter of less than about 10 micrometers was prepared according to the procedure of Example 14, except that a two-layer feedblock assembly was substituted for the five-layer feedblock.

EXAMPLE 18

A BMF web having a basis weight of 50 g/m² and comprising two-layer microfibers having an average diameter of less than about 10 micrometers was prepared according to the procedure of Example 17, except that the PP and SEBS/LLDPE blend melt streams were delivered to the two-layer feedblock in a 50:50 ratio.

EXAMPLE 19

A BMF web having a basis weight of 50 g/m² and comprising two-layer microfibers having an average diameter of less than about 10 micrometers was prepared according to the procedure of Example 17, except that the PP and SEBS/LLDPE blend melt streams were delivered to the two-layer feedblock in a 25:75 ratio.

Table 6 summarizes the tensile modulus values for BMF webs comprising two-layer microfibers of varying PP//SEBS/LLDPE compositions.

TABLE 6

Tensile Modulus
Two-Layer PP//SEBS/LLDPF BMF Webs
50 g/m² Basis Weight

| Example | Composition (parts PP/Blend) | MD Tensile Modulus kPa | Peak Load Strength(g) |
|---|---|---|---|
| Control I | 100:0 | 2034 | — |
| 17 | 75:25 | 10197 | 500 |
| 18 | 50:50 | 7357 | 477 |
| 19 | 25:75 | 3103 | 459 |
| Control VI | 0:100 | 434 | 145 |

EXAMPLE 20

A BMF web having a basis weight of 100 g/m² and comprising two-layer microfibers having an average diameter of less than 10 micrometers was prepared according to the procedure of Example 8, except that the collector distance was 15.2 cm (6 in.).

EXAMPLE 21

A BMF web having a basis weight of 100 g/m² and comprising two-layer microfibers having an average diameter of less than about 10 micrometers was prepared according to the procedure of Example 9, except that the collector distance was 15.2 cm (6 in.).

EXAMPLE 22

A BMF web having a basis weight of 100 g/m² and comprising two-layer microfibers having an average diameter of less than about 10 micrometers was prepared according to the procedure of Example 10, except that the collector distance was 15.2 cm (6 in.).

Table 7 summarizes the MD modulus values for a number of two-layer PE/PU web compositions which were prepared utilizing two collector distances.

TABLE 7

Web Modulus as a Function of Collector Distance
for Various Two-Layer PE/PU Compositions
100 g/m² Basis Weight

| Example | Pump Ratio PE/PU | Collector Distance (cm) | MD Tensile Modulus (kPa) |
|---|---|---|---|
| 8 | 75:25 | 30.5 | 4923 |
| 20 | 75:25 | 15.2 | 12590 |
| 9 | 50:50 | 30.5 | 3737 |
| 21 | 50:50 | 15.2 | 9494 |
| 10 | 25:75 | 30.5 | 2654 |
| 22 | 25:25 | 15.2 | 7929 |

EXAMPLE 23

A BMF web having a basis weight of 100 g/m² and comprising twenty-seven-layer microfibers having an average diameter of less than about 10 micrometers was prepared according to the procedure of Example 7, except that the PP and PU melt streams were delivered to the twenty-seven-layer feedblock such that the outer layer of the fibers was PU rather than PP (I/O vs O/I for Example 7 and the die orifices had a diameter of 17/1000 of an inch versus 15/1000 inch for Example 7).

Table 8 summarizes the MD modulus for two twenty-seven-layer layer PP/PU microfiber webs where the order of polymer feed into the feedblock was reversed, thereby inverting the composition of the outer layer of the microfiber.

TABLE 8

Effect of Outside Component
Twenty-Seven-Layer 25/75 PP/PU Composition
100 g/m² Basis Weight

| Example | Layer Composition | MD Tensile Modulus (kPa) |
|---|---|---|
| 23a | O/I | 14390 |
| 23 | I/O | 11632 |

EXAMPLE 24

A BMF web having a basis weight of 100 g/m² and comprising twenty-seven-layer microfibers having an average diameter of less than about 10 micrometers was prepared according to the procedure of Example 7, except that the PP and PU melt streams were delivered to the twenty-seven-layer feedblock which was maintained at 250° C. in a 75:25 ratio from two extruders which were maintained at 250° C. and 210° C., respectively, and a smooth collector drum was positioned 15.2 cm from the BMF die. The PP and PU melt streams were introduced into the feedblock assembly such that the outer layer of the fiber was PP (O/I).

EXAMPLE 25

A BMF web having a basis weight of 100 g/m² and comprising twenty-seven-layer microfibers having an average diameter of less than about 10 micrometers was prepared according to the procedure of Example 24, except that the PP and PU melt streams were delivered to the twenty-seven-layer feedblock in a 50:50 ratio.

EXAMPLE 26

A BMF web having a basis weight of 100 g/m² and comprising twenty-seven-layer microfibers having an average diameter of less than about 10 according to the procedure of Example 24, except that the PP and PU melt streams were delivered to the twenty-seven-layer feedblock in a 25:75 ratio.

EXAMPLE 27

Figure 4:

A BMF web having a basis weight of 100 g/m² and comprising twenty-seven-layer microfibers having an average diameter of less than about 10 micrometers was prepared according to the procedure of Example 24, except that a LLDPE (Aspun TM 6806, 105 MI, available from Dow Chemical) was substituted for the PP and the PE and PU melt streams were delivered to the twenty-seven-layer feedblock which was maintained at 210° C. in a 75:25 ratio from two extruders which were both maintained at 210° C. A scanning electron micrograph (FIG. 4-2000X) of a cross section of this sample was prepared after the polyurethane was washed out with tetrahydofuran, and the sample was then cut, mounted and prepared for analysis by standard techniques.

EXAMPLE 28

A BMF web having a basis weight of 100 g/m² and comprising twenty-seven-layer microfibers having an average diameter of less than about 10 micrometers was prepared according to the procedure of Example 27, except that the PE and PU melt streams were delivered to the twenty-seven-layer feedblock in a 50:50 ratio.

EXAMPLE 29

A BMF web having a basis weight of 100 g/m² and comprising twenty-seven-layer microfibers having an average diameter of less than about 10 micrometers was prepared according to the procedure of Example 27, except that the PE and PU melt streams were delivered to the twenty-seven-layer feedblock in a 25:75 ratio.

Table 9 summarizes the MD tensile modulus for several twenty-seven-layer microfiber webs where the composition of the outer layer of the fiber varied between PP and PE.

TABLE 9

Effect of PP vs PE on MD Web Tensile Modulus
27 Layer PP/PU and PE/PU Webs 100 g/m² Basis Weight

| Example | Web Composition | | MD Tensile Modulus (kPa) |
|---|---|---|---|
| | Polymers | Pump Ratio | |
| 24 | PP/PU | 75:25 | 95940 |
| 25 | PP/PU | 50:50 | 46396 |
| 26 | PP/PU | 25:75 | 28090 |
| 27 | PE/PU | 75:25 | 19926 |
| 28 | PE/PU | 50:50 | 12328 |
| 29 | PE/PU | 25:75 | 7819 |

EXAMPLE 30

Figure 5:
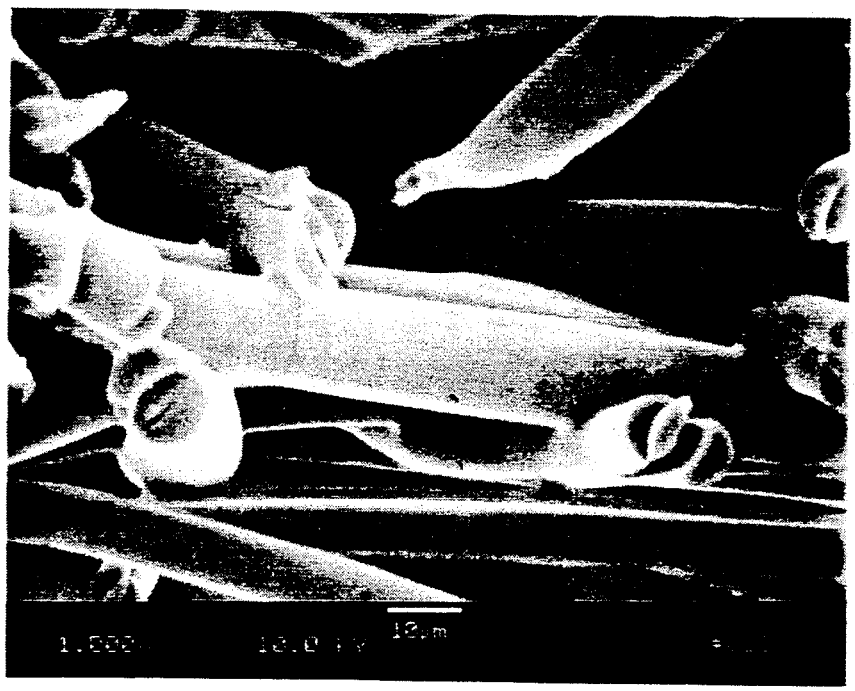
FIG. 4 and 5 are scanning electron micrographs of web cross sections, for Examples 27 and 30, respectively, prepared by the invention method.

A BMF web was prepared according to the procedure of Example 8 except that the PE and PU melt streams were delivered to a three-layer feedblock. The samples were prepared for SEM analysis as per Example 27 except the PU was not removed, FIG. 5(1000×).

The various modifications and alterations of this invention will be apparent to those skilled in the art without departing from the scope and spirit of this invention, and this invention should not be restricted to that set forth herein for illustrative purposes.

We claim:

1. A melt-blown nonwoven web comprising melt-blown microfibers having at least two continuous layers throughout said fiber length comprised of at least one first layer of a self-bonding material, at melt-blowing conditions, and at least one second layer of a relatively high modulus material wherein the melt-blown web has a tensile modulus at least 1.5 times greater than a mean web modulus, $M_1X_1 + M_2X_2$, where $M_1$ and $M_2$ are the tensile modulus values of corresponding nonwoven webs of the first layer material and second layer material respectively and $X_1$ and $X_2$ are the respective volume fractions of the first and second layer materials.

2. The nonwoven web of claim 1 wherein the melt-blown web has a tensile modulus 2.5 times the mean web modulus.

3. The nonwoven web of claim 1 wherein the melt-blown web has a tensile modulus greater than corresponding webs of the first and second layer materials alone.

4. The nonwoven web of claim 1 where the relatively high modulus material has a fiber tensile modulus 100 times or more the fiber tensile modulus of the relatively more self-bonding material.

5. The nonwoven web of claim 1 wherein the relatively high modulus material comprises an orientable polymer, and the self-bonding material comprises an elastomer.

6. The nonwoven web of claim 5 wherein the orientable polymer comprises a polyolefin or a polyester.

7. The nonwoven web of claim 1 wherein the self-bonding material is a semi-crystalline polymer or a block copolymer having a soft segment wherein the semi-crystalline polymer or soft segment has a glass transition point of less than about 25° C. and a crystallization half life, at a temperature 15° C. below the polymer melt temperature, of greater than 50,000 seconds.

8. The nonwoven web of claim 7 wherein the crystallization half life is greater than 100,000 seconds.

9. The nonwoven web of claim 7 wherein the glass transition point or soft segment glass transition point of the polymer is less than 15° C.

10. The nonwoven web of claim 1 wherein the self-bonding material has a glass transition temperature of less than 15° C.

11. The nonwoven web of claim 1 wherein the self-bonding material comprises a low molecular weight polyethylene polymer or a polypropylene copolymer with a polar comonomer.

12. The nonwoven web of claim 1 wherein the microfiber average diameter is less than 10 micrometers.

13. The nonwoven web of claim 1 wherein there are at least three layers in said microfibers.

14. The nonwoven web of claim 1 wherein there are at least five layers in said microfibers.

15. The nonwoven web of claim 14 wherein the microfiber layers are alternating.

16. The nonwoven web of claim 1 wherein the unconsolidated web is 0.01 to 5 centimeters thick.

* * * * *

UNITED STATES PATENT AND TRADEMARK OFFICE
CERTIFICATE OF CORRECTION

PATENT NO. : 5,176,952
DATED : January 5, 1993
INVENTOR(S) : Eugene G. Joseph and Daniel E. Meyer It is certified that error appears in the above-identified patent and that said Letters Patent is hereby corrected as shown below:

Column 9, line 53, delete "Kα" and insert --Kα--.

Column 10, line 26, after "(PP 3495G," insert --available from Exxon Chemical Corp.), to the feedblock--.

Column 12, line 43, delete "Morthaner™" and insert --Morthane™--.

Column 13, line 2, in the title of the paragraph, delete "CONTROL WEB 11X" and insert --CONTROL WEB III--.

Column 13, line 3, delete "(Aspunr™" and insert --(Aspun™--.

Signed and Sealed this

Nineteenth Day of October, 1993

*Attest:*

BRUCE LEHMAN

*Attesting Officer*    Commissioner of Patents and Trademarks